United States Patent
Shin et al.

(10) Patent No.: US 11,242,123 B2
(45) Date of Patent: Feb. 8, 2022

(54) BOIL-OFF GAS RE-LIQUEFYING SYSTEM

(71) Applicant: DAEWOO SHIPBUILDING & MARINE ENGINEERING CO., LTD., Gyeongsangnam-do (KR)

(72) Inventors: Hyun Jun Shin, Seoul (KR); Dong Kyu Choi, Seongnam-si (KR); Young Sik Moon, Gwangmyeong-si (KR); Su Kyung An, Gwangmyeong-si (KR); Joon Chae Lee, Seoul (KR)

(73) Assignee: DAEWOO SHIPBUILDING & MARINE ENGINEERING CO., LTD., Geoje-si (KR)

( * ) Notice: Subject to any disclaimer, the term of this patent is extended or adjusted under 35 U.S.C. 154(b) by 0 days.

(21) Appl. No.: 16/681,664

(22) Filed: Nov. 12, 2019

(65) Prior Publication Data

US 2020/0079485 A1 Mar. 12, 2020

Related U.S. Application Data

(63) Continuation of application No. 15/579,549, filed as application No. PCT/KR2016/004103 on Apr. 20, 2016, now abandoned.

(30) Foreign Application Priority Data

Jun. 2, 2015 (KR) .......................... 10-2015-0078142

(51) Int. Cl.
*F17C 9/02* (2006.01)
*B63H 21/38* (2006.01)
(Continued)

(52) U.S. Cl.
CPC ............. *B63H 21/38* (2013.01); *B63B 25/16* (2013.01); *F02M 21/0287* (2013.01); *F17C 6/00* (2013.01);
(Continued)

(58) Field of Classification Search
CPC ........ F25J 1/0035; F25J 1/0037; F25J 1/0201; F25J 1/0202; F25J 1/0025; F25J 2210/90;
(Continued)

(56) References Cited

U.S. PATENT DOCUMENTS

| 6,220,053 B1 * | 4/2001 | Hass, Jr. ................ F25J 1/0015 62/613 |
| 6,901,762 B2 | 6/2005 | Irie et al. |
| 10,364,013 B2 | 7/2019 | Shin et al. |
| 10,399,655 B2 | 9/2019 | Shin et al. |

(Continued)

FOREIGN PATENT DOCUMENTS

| CN | 202469476 U | 10/2012 |
| KR | 101356003 B1 * | 2/2014 |

OTHER PUBLICATIONS

KR-101356003-B1 Translation (Year: 2014).*

*Primary Examiner* — Brian M King
(74) *Attorney, Agent, or Firm* — K&L Gates LLP

(57) ABSTRACT

A system for reliquefying a boil off gas generated in a storage tank includes a first compressor compressing a partial amount (hereinafter, referred to as 'fluid a') of boil off gas discharged from the storage tank, a second compressor compressing another partial amount (hereinafter, referred to as 'fluid b') of boil off gas discharged from the storage tank, a second expanding unit expanding a partial amount (hereinafter, referred to as 'fluid c') of a flow formed as the fluid a and the fluid b join, a heat-exchanger cooling another partial amount (hereinafter, referred to as 'fluid d') of the flow formed as the fluid a and the fluid b join, and a first expanding unit expanding the fluid d cooled by the heat-exchanger, wherein the heat-exchanger heat-exchanges the fluid d with the fluid c as a coolant expanded by the second expanding unit to cool the fluid d.

6 Claims, 1 Drawing Sheet

(51) Int. Cl.
*F02M 21/02* (2006.01)
*F25J 1/00* (2006.01)
*F25J 1/02* (2006.01)
*F17C 6/00* (2006.01)
*B63B 25/16* (2006.01)
*B63J 99/00* (2009.01)

(52) U.S. Cl.
CPC ............ *F17C 9/02* (2013.01); *F25J 1/004* (2013.01); *F25J 1/0025* (2013.01); *F25J 1/0037* (2013.01); *F25J 1/0045* (2013.01); *F25J 1/0202* (2013.01); *F25J 1/023* (2013.01); *F25J 1/0249* (2013.01); *F25J 1/0277* (2013.01); *F25J 1/0288* (2013.01); *F25J 1/0294* (2013.01); *B63J 2099/003* (2013.01); *F02M 21/0215* (2013.01); *F17C 2221/033* (2013.01); *F17C 2223/0161* (2013.01); *F17C 2223/033* (2013.01); *F17C 2227/0185* (2013.01); *F17C 2227/0339* (2013.01); *F17C 2227/0358* (2013.01); *F17C 2265/03* (2013.01); *F17C 2265/037* (2013.01); *F17C 2265/066* (2013.01); *F17C 2270/0105* (2013.01); *F25J 2290/72* (2013.01); *Y02T 10/30* (2013.01)

(58) Field of Classification Search
CPC ...... F25J 2245/90; F17C 9/02; F17C 2265/03; F17C 2265/031; F17C 2265/032; F17C 2265/033
See application file for complete search history.

(56) References Cited

U.S. PATENT DOCUMENTS

| | | | |
|---|---|---|---|
| 2004/0068993 | A1 | 4/2004 | Irie et al. |
| 2007/0130976 | A1* | 6/2007 | Akehurst ............. F25B 49/027 62/228.5 |
| 2011/0056238 | A1 | 2/2011 | Mak |
| 2011/0056328 | A1 | 3/2011 | Ko |
| 2011/0094262 | A1 | 4/2011 | Turner et al. |
| 2012/0036888 | A1 | 2/2012 | Vandor |
| 2014/0202585 | A1 | 7/2014 | Barker |
| 2015/0330574 | A1* | 11/2015 | Fuchs .................... F17C 13/00 62/48.2 |
| 2016/0114876 | A1 | 4/2016 | Lee et al. |
| 2018/0148138 | A1 | 5/2018 | Shin et al. |
| 2018/0162492 | A1 | 6/2018 | An et al. |
| 2018/0170503 | A1 | 6/2018 | Shin et al. |
| 2018/0170504 | A1 | 6/2018 | Shin et al. |
| 2018/0170505 | A1 | 6/2018 | Shin et al. |
| 2018/0170506 | A1 | 6/2018 | Shin et al. |
| 2018/0170507 | A1 | 6/2018 | Shin et al. |
| 2018/0327056 | A1 | 11/2018 | Lee et al. |

* cited by examiner

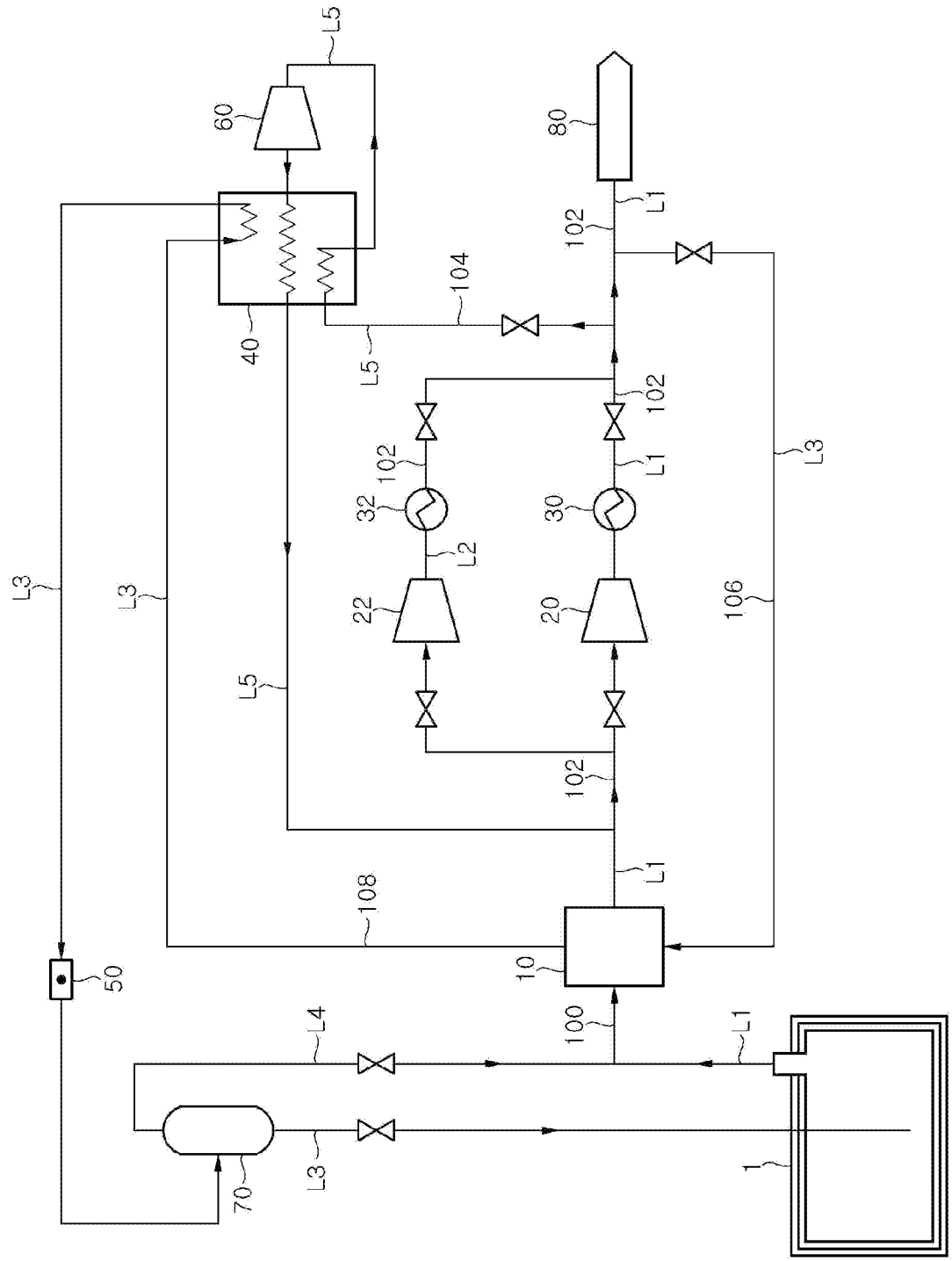

BOIL-OFF GAS RE-LIQUEFYING SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

The present invention relates to a system for reliquefying a boil off gas, and more particularly, to a system for reliquefying a boil off gas and simultaneously compressing the boil off gas to provide the compressed boil off gas to an engine using the boil off gas as fuel, or the like.

BACKGROUND ART

A liquefied natural gas (LNG) is obtained by refining natural gas collected from a gas field and subsequently liquefying the refined gas. A main ingredient of the LNG is methane and is liquefied at −163° C. at normal pressure. As demand for energy is on the rise and techniques for collecting and transporting the LNG have advanced, development of the LNG in medium and small maritime gas fields, which were conventionally considered to have low marketability, has actively been made.

The LNG, about 1/600 in volume, compared with that in a gaseous state, is appropriate for transportation. However, the LNG is easily evaporated at temperatures higher than −163° C., and thus, a storage tank having a heat insulation device is required to transport the LNG.

However, in spite of the presence of the heat insulation device, perfect insulation against the exterior is impossible and the LNG continues to be evaporated within the storage tank storing the LNG, and here, the evaporated LNG is called a boil-off gas (BOG).

Continuous accumulation of the boil off gas within the storage tank increases internal pressure of the storage tank to degrade stability of the storage tank and, movement of the storage tank due to a sea environment may accelerate generation of the boil off gas. Thus, facilities for reliquefying the boil off gas generated within the storage tank are required.

DISCLOSURE

Technical Problem

A method for reliquefying a boil off gas may include a method for reliquefying a boil off gas by heat-exchanging it with a separate coolant and a method for reliquefying the boil off gas using the boil off gas itself as a coolant without using any additional coolant. In particular, a system employing the method for reliquefying the boil off gas using the boil off gas itself as a coolant is called a partial reliquefaction system (PRS).

The PRS includes a compressor compressing a boil off gas discharged from a storage tank, and here, an amount of boil off gas which can be reliquefied may be determined according to capacity of the compressor. Thus, the related art PRS may not be able to immediately treat the boil off gas due to a limitation in capacity of the compressor.

An object of the present invention is to provide a reliquefaction system for a boil off gas, capable of exhibiting enhanced reliquefaction performance, compared with the existing reliquefaction system.

Technical Solution

According to an exemplary embodiment of the present invention, a system for reliquefying a boil off gas generated in a storage tank includes: a first compressor compressing a partial amount (hereinafter, referred to as 'fluid a') of boil off gas discharged from the storage tank; a second compressor compressing another partial amount (hereinafter, referred to as 'fluid b') of boil off gas discharged from the storage tank; a second expanding unit expanding a partial amount (hereinafter, referred to as 'fluid c') of a flow formed as the fluid a and the fluid b join; a heat-exchanger cooling another partial amount (hereinafter, referred to as 'fluid d') of the flow formed as the fluid a and the fluid b join; and a first expanding unit expanding the fluid d cooled by the heat-exchanger, wherein the heat-exchanger heat-exchanges the fluid d with the fluid c as a coolant expanded by the second expanding unit to cool the fluid d.

The system may further include: a cold heat collecting unit heat-exchanging the fluid d with the boil off gas discharged from the storage tank, as a coolant, to cool the fluid d.

The fluid d may be primarily cooled in the cold heat collecting unit, secondarily cooled by the heat-exchanger, and subsequently expanded by the first expanding unit so as to be reliquefied.

The fluid c may be supplied to the second expanding unit by way of the heat-exchanger, and the heat-exchanger may heat-exchange the fluid c before passing through the second expanding unit, the fluid c after passing through the second expanding unit, and the fluid d.

The fluid c which has passed through the second expanding unit and the heat-exchanger may join the boil off gas discharged from the storage tank.

The system may further include: a vapor-liquid separator separating a reliquefied liquefied natural gas (LNG) and a boil off gas remaining in a gaseous state in the fluid d which has passed through the first expanding unit, wherein the LNG separated by the vapor-liquid separator may be sent to the storage tank, and the boil off gas separated by the vapor-liquid separator may join the boil off gas discharged from the storage tank.

In the flow formed as the fluid a and the fluid b join, a remaining flow excluding the fluid c and the fluid d may be sent to a fuel consumer.

The first compressor and the second compressor may compress the boil off gas to 10 to 100 bar.

Advantageous Effects

As described above, the system for reliquefying a boil off gas has the following advantages and effects.

First, since the boil off gas primarily cooled by the cold heat collecting unit is decompressed through an additional cooling process by the heat-exchanger, compared with the existing PRS, reliquefaction efficiency and reliquefaction amount may be increased. In particular, most or all of the remaining boil off gas may be reliquefied without using a refrigerating cycle using a separate coolant, obtaining economical efficiency.

Second, since the boil off gases respectively compressed by the two compressors installed in parallel join to be used as a coolant of the heat-exchanger, a flow rate of the boil off gas used as the coolant in the heat-exchanger may be increased, further increasing reliquefaction efficiency and reliquefaction amount.

Third, the use of the already installed redundancy compressor to increase reliquefaction efficiency and reliquefaction amount contributes to securing space in a ship and reduces cost for installation of an additional compressor.

Fourth, a flow rate of a coolant and supply of cold heat may be flexibly controlled according to a discharge amount of boil off gas, an engine load based on a speed of a ship, and the like.

DESCRIPTION OF DRAWINGS

FIG. 1 is a schematic block diagram illustrating a configuration of a system for reliquefying a boil off gas according to an exemplary embodiment of the present invention.

BEST MODE

Hereinafter, an exemplary embodiment of the present invention will be described with reference to the drawings. The following description relates to an exemplary embodiment of the present invention, but it will be obvious to those skilled in the art that the present invention is not limited to an exemplary embodiment to be described below, but may be implemented in several forms different from a form mentioned in the following description without departing from the spirit and scope of the present invention. Thus, the scope of the present invention is defined by only claims.

FIG. 1 is a schematic block diagram illustrating a configuration of a system for reliquefying a boil off gas according to an exemplary embodiment of the present invention. In present exemplary embodiment, a boil off gas generated as a liquefied natural gas (LNG) is vaporized will be described as an example, but the present disclosure may also be applied to a boil off gas generated as a liquefied petroleum gas (LPG), or the like, is vaporized.

Referring to FIG. 1, the system for reliquefying a boil off gas according to an exemplary embodiment of the present invention includes a storage tank 1 storing an LNG, a cold heat collecting unit 10 installed on a downstream side of the storage tank 1, and a first compressor 20 and a second compressor 22 installed on a downstream side of the cold heat collecting unit 10.

A boil off gas discharged from the storage tank 1 is supplied to a fuel consumer 80 through a boil off gas supply line L1. The cold heat collecting unit 10 is installed in the boil off gas supply line L1 to collect cold heat from the boil off gas immediately after the boil off gas is discharged from the storage tank 1. The cold heat collecting unit 10 receives the boil off gas discharged from the storage tank 1 or a flow formed as the boil off gas discharged from the storage tank 1 and a boil off gas discharged from a vapor-liquid separator 70 (to be described hereinafter) join.

The first compressor 20 and the second compressor 22 compress the boil off gas discharged from the cold heat collecting unit 10. The first compressor 20 and the second compressor 22 are installed in parallel and may have the same performance. Also, the second compressor 22 may be a compressor for satisfying redundancy design of the first compressor 20.

The first compressor 20 is installed on the boil off gas supply line L1, and the second compressor 22 is installed on a redundancy line L2. The redundancy line L2 is branched from the boil off gas supply line L1 on an upstream side of the first compressor 20 and connected to the boil off gas supply line L1 on a downstream side of the first compressor 20.

Meanwhile, in FIG. 1, two compressors are illustrated, but this is merely illustrative and three or more compressors may be installed in parallel. The first compressor 20 and the second compressor 22 may compress a boil off gas to 10 to 100 bar.

The system for reliquefying a boil off gas according to present exemplary embodiment may include a first cooler 30 installed on the evaporation gas supply line L1 on a downstream side of the first compressor 20 and a second cooler 32 installed on the redundancy line L2 on a downstream side of the second compressor 22. The first cooler 30 may cool a boil off gas compressed by the first compressor 20, and the second cooler 32 cools a boil off gas compressed by the second compressor 22. The first cooler 30 and the second cooler 32 may cool the boil off gases through heat exchange with seawater, pure water, or air introduced from the outside.

The first compressor 20 and the second compressor 22 may be multi-stage compressors. In case where the first compressor 20 and the second compressor 22 are multi-stage compressors, a plurality of compression cylinders may be installed in series within each of the first compressor 20 and the second compressor 22, and a cooler is installed on a rear stage of each of the plurality of compression cylinders, and thus, the plurality of compression cylinders and the plurality of coolers may be alternately installed.

The system for reliquefying a boil off gas of the present exemplary embodiment includes a first expanding unit 50. The first expanding unit 50 is installed on a downstream side of a heat-exchanger 40 to expand a boil off gas cooled by the heat-exchanger 40.

The system for reliquefying a boil off gas of present exemplary embodiment may include the vapor-liquid separator 70. The vapor-liquid separator 70 is installed on a downstream side of the first expanding unit 50 and separates an LNG which is expanded and reliquefied by the first expanding unit 50 and a boil off gas which remains in a gaseous state.

The first expanding unit 50 may include any unit which is able to expand a boil off gas. For example, the first expanding unit 50 may be Joule-Thomson valve or an expander.

The first expanding unit 50 and the vapor-liquid separator 70 are installed on a boil off gas returning line L3. The boil off gas returning line L3 is branched from the boil off gas supply line L1 on a downstream side of the first compressor 20 and the second compressor 22, sequentially passes through the cold heat collecting unit 10, the heat-exchanger 40, and the first expanding unit 50, and is connected to the storage tank 1.

A partial amount of the flow formed as the boil off gas compressed by the first compressor 20 and the boil off gas compressed by the second compressor 22 join is supplied to the cold heat collecting unit 10 along the boil off gas returning line L3, and the boil off gas supplied to the cold heat collecting unit 10 along the boil off gas returning line L3 is heat-exchanged with the boil off gas discharged from the storage tank 1 and supplied to the cold heat collecting unit 10 along the boil off gas supply line L1, so as to be cooled.

In case where the present exemplary embodiment includes the vapor-liquid separator 70, the LNG separated by the vapor-liquid separator 70 is returned to the storage tank 1 along the boil off gas returning line L3, and the boil off gas in a gaseous state separated by the vapor-liquid separator 70 is supplied to the cold heat collecting unit 10 along a gas mixing line L4. The boil off gas supplied to the cold heat collecting unit 10 along the gas mixing line L4 joins the boil off gas discharged from the storage tank 1 and is used in the cold heat collecting unit 10.

The system for reliquefying a boil off gas of the present exemplary embodiment disclosure includes the heat-exchanger 40 and a second expanding unit 60. The heat-exchanger 40 is installed on a downstream side of the first compressor 20 and the second compressor 22 and on an upstream side of the first expanding unit 50 and additionally cools the boil off gas which has primarily been cooled when passing through the cold heat collecting unit 10 along the boil off gas returning line L3. In order for the heat-exchanger 40 to additionally cool the boil off gas, the flow formed as the boil off gas compressed by the first compressor 20 and the boil off gas compressed by the second compressor join is supplied to the heat-exchanger 40 along a re-circulation line L5 and used as a coolant.

The re-circulation line L5 is branched from the boil off gas supply line L1 on the downstream side of the first compressor 20 and the second compressor 22, passes through the second expanding unit 60 and the heat-exchanger 40, and is connected to the boil off gas supply line L1 on an upstream side of the first compressor 20 and the second compressor 22.

The second expanding unit 60 is installed on the re-circulation line L5. A partial amount of the flow formed as the boil off gas compressed by the first compressor 20 and the boil off gas compressed by the second compressor 22 join is supplied to the second expanding unit 60 along the re-circulation line L5 and decompressed by the second expanding unit 60 so as to be lowered in temperature.

The boil off gas lowered in temperature by the second expanding unit 60 is supplied to the heat-exchanger 40 and used as a coolant to heat-exchange and cool one or more of a fluid which passes through the cold heat collecting unit 10 and is subsequently supplied to the heat-exchanger 40 along the boil off gas returning line L3 and a fluid which is supplied to the heat-exchanger 40 along the re-circulation line L5 before being supplied to the second expanding unit 60.

That is, a partial amount of the flow formed as the boil off gas compressed by the first compressor 20 and the boil off gas compressed by the second compressor 22 join is primarily heat-exchanged in the heat-exchanger 40 and expanded by the second expanding unit 60, and sent back to the heat-exchanger 40 so as to be secondarily heat-exchanged, along the re-circulation line L5.

The system for reliquefying a boil off gas of the present exemplary embodiment includes the fuel consumer 80 which receives a partial amount of the flow formed as the boil off gas compressed by the first compressor 20 and the boil off gas compressed by the second compressor 22 join, and uses the same as fuel. The fuel consumer 80 may be an engine, a generator, or the like, which is driven by a boil off gas as fuel, and in particular, the fuel consumer 80 of the present exemplary embodiment may be an X-DF engine using a natural gas at pressure of about 16 bar as fuel.

In order to easily describe an operation of the system for reliquefying a boil off gas of the present exemplary embodiment, a main flow of a fluid will be defined. Hereinafter, the boil off gas discharged from the storage tank 1 or a flow formed as the boil off gas discharged from the storage tank 1 and the boil off gas in a gaseous state separated by the vapor-liquid separator 70 join will be referred to as a first flow 100, a flow formed as the first flow 100 is bifurcated after passing through the cold heat collecting unit 10, supplied to the first compressor 20 or the second compressor 22, and join again so as to be supplied to the fuel consumer 80 will be referred to as a second flow 102, a flow branched from the second flow 102 on a downstream side of the first compressor 20 and the second compressor 22 and supplied to the heat-exchanger 40 will be referred to as a third flow 104, a flow branched from the second flow 102 on a downstream side of the first compressor 20 and the second compressor 22 and supplied to the cold heat collecting unit 10 will be referred to as a fourth flow 106, and a flow formed as the fourth flow 106 passes through the cold heat collecting unit 10 and is supplied to the heat-exchanger 40 will be referred to as a fifth flow 108. The first flow 100 turns to the second flow 102 as it passes through the cold heat collecting unit 10, and the fourth flow 106 turns to the fifth flow 108 as it passes through the cold heat collecting unit 10.

The system for reliquefying a boil off gas of the present exemplary embodiment includes a plurality of valves controlling a flow rate of a fluid in a liquid or gaseous state flowing in each line. Valves may be installed on the boil off gas supply line L1 on the upstream side of the first compressor 20, on the redundancy line L2 on the upstream side of the second compressor 22, on the boil off gas supply line L1 on the downstream side of the first compressor 20 (on the downstream side of the first cooler 30 in case where the present exemplary embodiment includes the first cooler 30), on the redundancy line L2 on the downstream side of the second compressor 22 (on the downstream side of the second cooler 32 in case where the present exemplary embodiment includes the second cooler 32), on the re-circulation line L5 branched from the boil off gas supply line L and connected to the heat-exchanger 40, on the boil off gas returning line L4 branched from the boil off gas supply line L1 and connected to the cold heat collecting unit 10, on the boil off gas returning line L3 in which the LNG separated by the vapor-liquid separator 70 is sent to the storage tank 1, and on the gas mixing line L4 in which the natural gas in a gaseous state separated by the vapor-liquid separator 70 is supplied to the cold heat collecting unit 10, respectively.

The valves of the present exemplary embodiment control a flow rate of a fluid in a liquid or gaseous state according to conditions and situations such as a discharge amount of a boil off gas discharged from the storage tank 1, a supply amount of a boil off gas required for the fuel consumer 80, or the like.

Hereinafter, an operation of the system for reliquefying a boil off gas according to an exemplary embodiment of the present invention will be described in detail with reference to FIG. 1.

A boil off gas generated within the storage tank 1 is discharged from the storage tank 1 and supplied to the cold heat collecting unit 10. The boil off gas discharged from the storage tank 1 joins a boil off gas in a gaseous state separated by the vapor-liquid separator 70 to form the first flow 100.

Meanwhile, the cold heat collecting unit 10 may collect cold heat of the first flow 100 to cool other boil off gas. The cold heat collecting unit 10 collects cold heat of the first flow 100 and sends the cold heat to a flow supplied back to the cold heat collecting unit 10, i.e., the fourth flow 106, in the second flow 102 pressed while passing through the compressors 20 and 22. In the cold heat collecting unit 10 the first flow 100 and the fourth flow 106 are heat-exchanged and the first flow 100 is heated and the fourth flow 106 is cooled. The first flow 100 heated by the cold heat collecting unit 10 turns to the second flow 102 and the fourth flow 106 cooled by the cold heat collecting unit 10 turns to the fifth flow 108.

The second flow 102 passing through the cold heat collecting unit 10 is bifurcated and supplied to the first compressor 20 or the second compressor 22. Pressure by which the first compressor 20 and the second compressor 22 compress the boil off gas may be varied according to pressure required for the fuel consumer 80. For example, in case where the fuel consumer 80 is an engine for propelling a ship and required pressure of boil off gas is 10 to 100 bar, the first compressor 20 and the second compressor 22 may each compress the boil off gas to 10 to 100 bar.

Meanwhile, in case where an amount of cold heat required for reliquefaction is changed according to an amount of boil off gas discharged from the storage tank 1 or an amount of boil off gas required for the fuel consumer 80 is changed, only some or all of the plurality of compressors 20 and 22 may be actuated accordingly.

For example, if processing is possibly performed by operating only some of the plurality of compressors 20 and 22 in consideration of an amount of boil off gas to be reliquefied and an amount of boil off gas to be supplied to the fuel consumer 80, the boil off gas is supplied only to some of the plurality of compressors 20 and 22 by opening or closing valves installed on the upstream side and the downstream side of the compressors 20 and 22.

If, however, processing is possibly performed by operating all the plurality of compressors 20 and 22 in consideration of an amount of boil off gas to be reliquefied and an amount of boil off gas to be supplied to the fuel consumer 80, the boil off gas is supplied to all of the plurality of compressors 20 and 22 by opening all the valves installed on the upstream side and the downstream side of the compressors 20 and 22.

When all the compressors 20 and 22 are driven, cold heat required for reliquefying the boil off gas may be additionally supplied, compared with the case of driving only some of the plurality of compressors 20 and 22, increasing reliquefaction efficiency and reliquefaction amount.

Some of the plurality of compressors of the present disclosure may be compressors for redundancy. For example, as illustrated in FIG. 1, when the present exemplary embodiment includes two compressors 20 and 22, any one of the two compressors may be a compressor for redundancy.

The redundancy compressor is a compressor installed in preparation for a case where a main compressor is broken down, and in general, the redundancy is essential according to regulations for ships. The redundancy compressor is required to replace the main compressor, and thus, the redundancy compressor may have the same specifications as those of the main compressor in most cases.

However, since the redundancy compressor operates only in the event of an emergency when the main compressor is broken down, provision of the redundancy compressor may be ineffective in terms of installation cost for the redundancy compressor or in consideration of space of a ship occupied by the redundancy compressor.

In the present exemplary embodiment, some of the plurality of compressors are configured as redundancy compressors in the system for reliquefying a boil off gas, and thus, the redundancy compressors, which are to be essentially installed in the related art but are rarely used, may be utilized.

In addition, according to the system for reliquefying a boil off gas of the present exemplary embodiment, capacity of the compressors may be reduced, compared with the related art.

An amount of boil off gas generated within the storage tank is increased as an amount of the LNG gas within the storage tank is increased. Thus, while a ship is heading toward an area of production of the LNG, the storage tank is almost empty, and thus, a generation amount of boil off gas is small, and while the ship is loaded with an LNG in the area of production and heads toward an area of consumption, the storage tank is almost full, and thus, a generation amount of boil off gas is large.

Also, when a speed of the ship is high, an amount of fuel required for an engine is increased, increasing consumption of the boil off gas, and when the speed of the ship is low, an amount of fuel required for the engine is reduced, reducing consumption of the boil off gas.

That is, an amount of boil off gas to be reliquefied is varied according to amounts of the LNG within the storage tank, speeds of the ship, and the like, and thus, in configuring the system for reliquefying a boil off gas, capacity of the main compressor is set to cope with a situation in which a generation amount of boil off gas is the largest and consumption of the boil off gas is smallest, that is, a situation in which boil off gas to be reliquefied is the largest, and capacity of the redundancy compressor is set according to capacity of the main compressor.

However, unlike the related art, according to the system for reliquefying a boil off gas of the present exemplary embodiment, the main compressor does not treat the entirety of the boil off gas and both the redundancy compressor and the main compressor are driven to treat the boil off gas when an amount of boil off gas to be reliquefied exceeds a determined numerical value. Thus, a main compressor having smaller capacity may be installed, and since the main compressor having smaller capacity is installed, a redundancy compressor having smaller capacity may be installed. Installation of the main compressor and redundancy compressor having smaller capacity may solve the problem of securing space of a ship and cost.

In the present exemplary embodiment, the first compressor 20 may be a main compressor and the second compressor may be a redundancy compressor.

Meanwhile, the second flow 102 formed as the boil off gas compressed by the first compressor 20 and the boil off gas compressed by the second compressor 22 join is supplied to the fuel consumer 80, the fourth flow 106 which is a portion branched from the second flow 102 formed as the boil off gas compressed by the first compressor 20 and the boil off gas compressed by the second compressor 22 join is supplied to the cold heat collecting unit 10, and the third flow 104, which is another portion branched from the second flow 102 formed as the boil off gas compressed by the first compressor 20 and the boil off gas compressed by the second compressor 22 join is supplied to the heat-exchanger 40.

The system for reliquefying a boil off gas according to the present exemplary embodiment is particularly advantageous when the compressors 20 and 22 compress the boil off gas to relatively low pressure. In the case of compressing boil off gas to high pressure of about 100 bar or higher than 100 bar by the compressors, although the boil off gas, which is to undergo a reliquefaction process along the evaporation gas returning line L3, simply undergoes the process of cooling by the cold heat collecting unit 10 and expanding by the first expanding unit 50, relatively excellent reliquefaction efficiency may be obtained. However, in the case of compressing the boil off gas to low pressure below 100 bar, in particular, to low pressure of about 10 bar, by the compressor, only cooling by the cold heat collecting unit 10 may not obtain desirable reliquefaction efficiency and reliquefaction amount.

According to the system for reliquefying a boil off gas of the present exemplary embodiment, since the boil off gas primarily cooled by the cold heat collecting unit 10 is additionally cooled by the heat-exchanger 40 and subsequently expanded by the first expanding unit 50, reliquefaction efficiency and reliquefaction amount of the boil off gas may be enhanced.

The third flow 104 partially branched from the second flow 102 may directly be sent to the second expanding unit 60 or may be sent to the second expanding unit 60 by way of the heat-exchanger 40. The third flow 104 decompressed and cooled by the second expanding unit 60 is supplied to the heat-exchanger 40 and used as a coolant.

In case where the third flow 104 is sent to the second expanding unit 60 by way of the heat-exchanger 40, the third flow 104 primarily supplied to the heat-exchanger 40 is decompressed and cooled in the second expanding unit 60 and subsequently heat-exchanged with the third flow 104 supplied to the heat-exchanger 40 so as to be cooled. The third flow 104 passing through the second expanding unit 60 and the heat-exchanger 40 is sent back to the upstream side of the compressors 20 and 22 to join the second flow 102.

The fourth flow 106 heat-exchanged with the first flow 100 so as to be cooled in the cold heat collecting unit 10 turns to the fifth flow 108 and is supplied to the heat-exchanger 40. The fifth flow 108 supplied to the heat-exchanger 40 is heat-exchanged with the third flow 104 which has been expanded by the second expanding unit 60.

The fifth flow 108 cooled by the heat-exchanger 40 is decompressed and cooled through the first expanding unit 50 so as to be partially or entirely reliquefied. When the present exemplary embodiment includes the vapor-liquid separator 70, the LNG reliquefied through the first expanding unit 50 and the boil off gas remaining in a gaseous state are separated by the vapor-liquid separator 70, the LNG separated by the vapor-liquid separator 70 is sent to the storage tank 1, and the boil off gas in a gaseous state separated by the vapor-liquid separator 70 is supplied back to the cold heat collecting unit 10 to repeat the foregoing processes.

Although the exemplary embodiment of the present invention has been described hereinabove, the abovementioned exemplary embodiment may be modified and applied in several other manners by those skilled in the art without departing from the spirit and scope of the present invention as defined in the claims.

What is claimed is:

1. A method of operating a ship having a main compressor, a redundancy compressor, at least one propulsion engine, and a tank containing liquefied gas, the method comprising:
supplying, to either or both of the main compressor and the redundancy compressor, boil-off gas (BOG) discharged from the tank via a BOG supply line;
compressing at least part of the BOG from the BOG supply line to provide a compressed BOG,
splitting the compressed BOG a first flow for consumption at the at least one propulsion engine, a second flow for re-liquefying to return to the tank, and a third flow for cooling the second flow prior to returning to the tank;
supplying the first flow of compressed BOG to the at least one propulsion engine of the ship for consumption;
processing the second flow of compressed BOG for liquefying at least part of the second flow to provide a liquefied flow for returning to the tank; and
processing the third flow of compressed BOG, which comprises:
expanding the third flow at a first expander,
subsequently, at a first heat exchanger, heat-exchanging the third flow with the second flow to cool the second flow, and
subsequently, supplying back to either or both of the main compressor and the redundancy compressor,
wherein the second flow for re-liquefaction depends upon an amount of BOG discharge from the tank and also depends an amount of BOG consumption at the at least one propulsion engine,
wherein an amount of BOG generation within the tank depends upon a level of the liquefied gas contained in the tank, and the maximum amount of the BOG generation occurs when the liquefied gas is at its maximum level in the tank,
wherein the ship is designed
such that neither of the main compressor and the redundancy compressor has a capacity to compress the maximum amount of BOG generation, and
such that the main compressor and the redundancy compressor are installed in parallel with each other and, when running, configured to receive at least part of the BOG discharged from the tank and to provide at least part of the compressed BOG,
such that the boil-off gas discharged from the tank is compressed by either or both of the main compressor and the redundancy compressor based on the second flow,
in which, when the second flow for re-liquefaction exceeds a predetermined value, the redundancy compressor compresses a portion of the boil-off gas discharged from the tank along with the main compressor,
in which, when the second flow for re-liquefaction does not exceed the predetermined value, the redundancy compressor does not run and the main compressor compresses the boil-off gas discharged from the tank.

2. The method of claim 1, wherein the main compressor and the redundancy compressor have the same compressing capacity.

3. The method of claim 1, wherein the main compressor and the redundancy compressor have substantially the same compressing capacity.

4. The method of claim 1, wherein the first flow of compressed boil-off gas is supplied to the propulsion engine at a pressure level in a range between 10 bar and 100 bar.

5. The method of claim 1, wherein processing the second flow comprises:
heat-exchanging, at the first heat exchanger, the second flow with the third flow to cool the second flow;
subsequently expanding the second flow at a second expander to liquefy the at least part of the second flow;
subsequently separating liquid from gas at a separator for providing the liquefied flow and a gaseous flow; and
subsequently sending the liquefied flow to the tank and sending the gaseous flow to the boil-off gas supply line for supplying back to either or both of the main compressor and the redundancy compressor.

6. The method of claim 5, further comprising:
prior to cooling the second flow at the first heat exchanger, heat-exchanging the second flow, at a second heat exchanger, with the boil-off gas flowing the boil-off gas supply line.

\* \* \* \* \*